(12) United States Patent
Hibi et al.

(10) Patent No.: US 6,669,182 B2
(45) Date of Patent: Dec. 30, 2003

(54) FLUID-FILLED VIBRATION-DAMPING DEVICE AND METHOD OF PRODUCING THE SAME

(75) Inventors: Satoru Hibi, Ichinomiya (JP); Mitsuhiro Takayanagi, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/102,476

(22) Filed: Mar. 20, 2002

(65) Prior Publication Data
US 2002/0140144 A1 Oct. 3, 2002

(30) Foreign Application Priority Data
Mar. 30, 2001 (JP) .......................................... 2001-102333

(51) Int. Cl.[7] ............................................... F16F 13/00
(52) U.S. Cl. ................. 267/140.13; 267/219; 267/141.4
(58) Field of Search ................................. 267/219, 140, 267/140.11, 140.13, 140.4, 14.1, 141.1, 141.2, 141.3, 141.4

(56) References Cited

U.S. PATENT DOCUMENTS

| | | | | |
|---|---|---|---|---|
| 4,836,513 A | * | 6/1989 | Kramer et al. | 267/140.13 |
| 5,143,358 A | * | 9/1992 | Hibi et al. | 267/140.13 |
| 5,183,243 A | * | 2/1993 | Matsumoto | 267/140.13 |
| 5,240,233 A | * | 8/1993 | Kato et al. | 267/140.13 |
| 5,269,498 A | * | 12/1993 | Bretaudeau et al. | 267/140.13 |
| 5,499,799 A | * | 3/1996 | Kojima | 267/140.13 |
| 5,769,402 A | * | 6/1998 | Ide et al. | 267/140.14 |
| 5,964,456 A | | 10/1999 | Someya | 267/140.13 |
| 6,082,718 A | * | 7/2000 | Yamada et al. | 267/140.14 |
| 6,224,045 B1 | * | 5/2001 | Muramatsu et al. | 267/140.13 |
| 6,257,562 B1 | * | 7/2001 | Takashima et al. | 267/141.1 |
| 6,523,813 B1 | * | 2/2003 | Kato | 267/140.11 |
| 2002/0014728 A1 | * | 2/2002 | Takeo et al. | 267/140.11 |
| 2002/0063367 A1 | * | 5/2002 | Takashima et al. | 267/140.11 |

FOREIGN PATENT DOCUMENTS

| | | |
|---|---|---|
| JP | 8-128491 | 5/1996 |
| JP | 2000-74130 | 3/2000 |
| JP | 2001-50333 | 2/2001 |

* cited by examiner

*Primary Examiner*—Christopher P. Schwartz
*Assistant Examiner*—Devon Kramer
(74) *Attorney, Agent, or Firm*—Rossi & Associates

(57) ABSTRACT

A fluid-filled vibration-damping device including an elastic body elastically connecting a first and a second mounting member to fluid-tightly close one open-end of the second mounting member, and mutually assembled a movable rubber plate bonded to a first support member and a flexible rubber layer bonded to a second support member are fluid-tightly fixed to the other open-end of the second mounting member by caulking such that the movable rubber plate cooperate with the elastic body to form a primary fluid chamber and the movable rubber plate and the flexible rubber layer cooperate to form an auxiliary fluid chamber, which are filled with a non-compressible fluid and connected together through an orifice passage. A partition member disposed in the auxiliary fluid chamber divides the auxiliary fluid chamber into an intermediate chamber partially defined by the movable rubber plate and an equilibrium chamber partially defined by the flexible rubber layer, which are connected together through a fluid passage, and includes an engaging piece extending toward and being engaged with the first or second support members to be provisionally fixed to the member upon assembly of the partition member. A method of producing the same is also disclosed.

10 Claims, 6 Drawing Sheets

FLUID-FILLED VIBRATION-DAMPING DEVICE AND METHOD OF PRODUCING THE SAME

INCORPORATED BY REFERENCE

The disclosure of Japanese Patent Application No. 2001-102333 filed on Mar. 30, 2001 including the specification, drawings and abstract is incorporated herein by reference in its entirety.

BACKGROUND OF THE INVENTION

1. Field of the Invention

The present invention relates generally to fluid-filled vibration-damping devices such as an engine mount for use in an automotive vehicle, and more particularly to such a fluid-filled vibration-damping device which is capable of exhibiting a vibration damping effect on the basis of flows of a non-compressible fluid filled therein.

2. Description of the Related Art

A fluid-filled vibration-damping device is known as one type of vibration-damping devices including a vibration damping mount or bushing, which is interposed between two members of a vibration system so as to flexibly connect these two members or mount one of these members on the other member in a vibration damping manner. Such a fluid-filled vibration-damping device is capable of exhibiting a vibration damping effect with the help of resonance or flows of a non-compressible fluid filled in its interior space. Since the fluid-filled vibration-damping device includes a plurality of liquid chambers and orifice passages for permitting flows of the non-compressible fluid between these chambers upon application of a vibrational load to the vibration-damping device, it is generally required to house these chambers and orifice passages within the device with high space utilization so that the device is made simple in construction and compact in size in its entirety.

The present assignee has been disclosed in JP-A-2001-50333 an example of the fluid-filled vibration-damping device, in which a first mounting member and a second mounting member having a generally cylindrical configuration are disposed such that one of opposite open-ends of the second mounting member is opposed to the first mounting member with an axial spacing therebetween, and a rubber elastic body elastically connects the first and second mounting members while fluid-tightly closing the one of opposite open-ends of the second mounting member. The disclosed fluid-filled vibration-damping device further includes a movable rubber plate bonded at its peripheral portion to an annular first support member made of metal and a flexible rubber layer bonded at its peripheral portion to an annular second support member made of metal. These movable rubber plate and the flexible rubber layer are assembled with each other in their axial directions with a given axial spacing therebetween while the first and second support members are held in abutting contact with each other at their outer peripheral portions. The movable rubber plate and the flexible rubber layer thus assembled are fixed to the other open-end of the second mounting member by caulking or fluid-tightly crimping the other open-end of the second mounting member against the mutually laminated outer peripheral portions of the first and second support members, thereby fluid-tightly closing the other open-end of the second mounting member. The rubber elastic body and the movable rubber plate cooperate to define therebetween a primary fluid chamber to which a vibrational load to be damped is applied, and the movable rubber plate and the flexible rubber layer cooperate to define therebetween an auxiliary fluid chamber. The primary and auxiliary fluid chambers are both filled with the non-compressible fluid, and are held in fluid communication through an orifice passage that is disposed between the first and second support members so as to extend circumferentially. The disclosed fluid-filled vibration-damping device constructed as described above can exhibit an excellent vibration damping effect by utilizing resonance of the fluid flowing through the orifice passage induced by a pressure difference between the primary and auxiliary fluid chambers generated upon application of the vibrational load to the device.

An extensive study of the disclosed fluid-filled vibration-damping device by the inventors of the present invention reveals that it is effective to divide the auxiliary fluid chamber by a partition member into an intermediate chamber partially defined by the movable rubber plate and an equilibrium chamber partially defined by the flexible rubber layer, and to form another fluid passage for fluid communication between the intermediate chamber and the equilibrium chamber, for thereby enabling the fluid-filled vibration-damping device to exhibit an excellent vibration damping effect over a wide frequency range, on the basis of the flows of the fluid through the orifice and the fluid passages. Described in detail, the fluid passage for fluid communication between the intermediate and equilibrium chambers is tuned to a frequency band that is different from the frequency band to which the orifice passage is tuned, so that the thus modified fluid-filled vibration-damping device can exhibit a desired vibration damping effect on the basis of the resonance of the fluid that is forced to flow through the orifice and fluid passages with respect to vibrations in a plurality of frequency ranges to which the orifice and fluid passages are tuned respectively.

However, the modified fluid-filled vibration-damping device requires an additional manufacturing step for assembling the partition member in the auxiliary fluid chamber, making it cumbersome to manufacture the device. Therefore, the fluid-filled vibration-damping device suffers from a high manufacturing cost and a deteriorated production efficiency.

SUMMARY OF THE INVENTION

It is therefore one object of this invention to provide a fluid-filled vibration-damping device, which is novel in construction, and which makes it possible to easily assemble a partition member into an auxiliary fluid chamber held in fluid communication with a primary fluid chamber through an orifice passage, with simple structure and with high production efficiency, and to effectively form the orifice passage and a fluid passage, which are tuned to different frequency bands. It is another object of the invention to provide a method of producing such a fluid-filled vibration-damping device.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled vibration-damping device comprising: (a) a first mounting member; (b) a second mounting member having a generally cylindrical configuration and being spaced apart from the first mounting member with one of axially opposite open-end portions thereof opposed to the first mounting member; (c) an elastic body elastically connecting the first and second mounting member while fluid-tightly closing the one of opposite open-end portions of the second mounting member; (d) a movable rubber plate bonded at a peripheral portion thereof to an annular first support member; (e) a flexible rubber layer bonded at a peripheral portion thereof to an annular second support member, the movable rubber plate and flexible rubber layer being axially assembled with each other and fixed to an other one of axially opposite open-end portions of the second mounting member by means of caulking of the other one of axially opposite open-end portions of the second mounting member against the first and second support members so as to fluid tightly close the other one of opposite open-end portions of the second mounting member such that the elastic body and the movable rubber plate cooperate to form therebetween a primary fluid chamber to which a vibrational load is applied and the movable rubber plate and the flexible rubber layer cooperate to form therebetween an auxiliary fluid chamber, the primary and auxiliary fluid chamber being filled with non-compressible fluid and held in fluid communication with each other through an orifice passage that is formed between the first and second support members so as to extend circumferentially; (f) a partition member disposed in the auxiliary fluid chamber with an peripheral portion thereof forcedly held by and between the first and second support members, so as to divide the auxiliary fluid chamber into an intermediate chamber partially defined by the movable rubber plate and an equilibrium chamber partially defined by the flexible rubber layer; and (g) a fluid passage for fluid communication between the intermediate chamber and the equilibrium chamber, wherein the partition member includes an engaging piece extending toward and being engaged with one of the first and second support members so as to enable the partition member to be provisionally fixed to the one of the first and second support members for assembly of the partition member.

In the fluid-filled vibration-damping device constructed according to this mode of the invention, the partition member is forcedly held by and between the first and second support members and then firmly fixed to these first and second support members, thus eliminating a need of caulking, bonding or another specific arrangement to firmly fix the partition member to the second mounting member. Therefore, the present invention makes it possible to firmly fix the partition member to the second mounting member with ease and with a simple fixing arrangement or structure. Moreover, the engaging piece of the partition member permits a provisional fixing of the partition member to one of the first and second support members, before assembling the first and second support member to the second mounting member. This arrangement makes it possible to automatically install the partition member in position by only assembling the first and second support members with the second mounting member according to the same manner as in the conventional vibration-damping device having no partition member, without requiring any additional arrangement. Thus, the fluid-filled vibration-damping device of the present invention can exhibit high production efficiency. Moreover, the movable rubber plate is directly exposed to the primary fluid chamber over a substantially entire surface area thereof, so that the movable rubber plate provided in the fluid-filled vibration-damping device of the present invention is capable of receiving a pressure of the fluid in the primary fluid chamber in an effective manner.

(2) A fluid-filled vibration-damping device according to the above mode (1), wherein the first and second support members include respective sealing rubbers formed at respective portions by which the peripheral portion of the partition member is forcedly held so that the peripheral portion of the partition member is fluid-tightly forcedly held by and between the first and second support members via the sealing rubbers. In this mode of the invention, a fluid-tight sealing between the intermediate chamber and the equilibrium chamber is effectively enhanced, thus preventing undesirable leakage of the fluid between the intermediate chamber and the equilibrium chamber, allowing the fluid-filled vibration-damping device to exhibit a desired damping effect with high stability. In addition, the partition member is elastically compressed by and between the first and second supporting members via the sealing rubbers, permitting a relatively large amount of tolerance of dimensional errors of the components, thus making it easy to manufacture the fluid-filled vibration-damping device. Preferably, the sealing rubber of the first support member is integrally formed with the movable rubber plate bonded to the first support member, while the sealing rubber of the second support member is integrally formed with the flexible rubber layer bonded to the second support member.

(3) A fluid-filled vibration-damping device according to the above-indicated mode (1) or (2), wherein the first support member has a generally hook-shape in cross section and includes a cylindrical inner sleeve portion and an outward flange portion extending radially outwardly from one of axially opposite end portions of the inner sleeve portion, while the second support member has a generally hook-shape in cross section and includes a cylindrical outer sleeve portion and an inwardly flange portion extending radially inwardly from one of axially opposite end portions of the outer cylindrical portion, the first and second support members being axially assembled with each other such that the inner and outer sleeve portions are opposed to each other with an radial spacing therebetween while the outward and inward flange portions are opposed to each other with an axial spacing therebetween, to thereby form therebetween the orifice passage. This arrangement makes it possible to obtain a relatively large length and a relatively large cross sectional area of the orifice passage, while ensuring a high space utilization, thus providing a comparatively high degree of freedom in tuning the orifice passage. In this respect, the outer sleeve portion of the second annular support member may have a tapered configuration with a diameter gradually decreasing from one of axially opposite ends thereof toward the other. This arrangement is effective to make the fluid-filled vibration-damping device compact in size while assuring a sufficiently large cross sectional area of the orifice passage, thus effectively preventing undesirable interference between the fluid-filled vibration-damping device with other members or devices installed on the vehicle.

(4) A fluid-filled vibration-damping device according to the above-indicated mode (3), further comprising an elastic support member formed on an outer circumferential surface of the inner sleeve portion of the first support member and having an engaging portion formed on an outer circumferential surface thereof, wherein the engaging portion is engageable with the engaging piece of the partition member.

This arrangement makes it easy to provisionally fix the partition member to the first support member by only assembling the partition member and the first support member with each other in the axial direction. For instance, the engaging piece of the partition member may be provided with a raised or recessed portion in its inner circumferential portion, while the elastic support member is provided at its outer circumferential surface with a recessed or raised portion whose profile matches to that of the raised or recessed portion formed in the inner circumferential portion of the engaging piece, so that the engaging piece and the engaging portion are engaged with each other with their recessed and raised portion fixed together. Preferably, the engaging piece is provided with an engaging raised portion formed in and protrude radially inwardly from its inner circumferential surface thereof, and the elastic support member is provided with an engaging recessed portion open in its outer circumferential surface. The engaging raised portion of the engaging piece is fitted into the engaging recessed portion of the elastic support member, to thereby engaging the engaging piece and the elastic support member with each other. Preferably, the engaging piece in contact with the elastic support member of the first support member protrudes with an axial length or height that is insufficient to reach the outward flange portion of the first support member, when assembled, for the sake of easiness of dimension control of the components. Yet preferably, the elastic support member of the first support member is integrally formed with the movable rubber plate. When the present mode (4) of the invention is employed together with the above-indicated mode (2), the elastic support member is also integrally with the sealing rubber of the first support member.

(5) A fluid-filled vibration-damping device according to the above-indicated mode (3), wherein the second support member further includes a cylindrical support portion integrally formed at an inner peripheral portion of the inward flange portion thereof, so as to extend axially outwardly, and an elastic support member formed on an inner circumferential surface of the cylindrical support portion and provided with an engaging portion formed at an inner circumferential surface thereof, wherein the engaging portion is engageable with the engaging piece of the partition member. This arrangement makes it easy to provisionally fix the partition member to the second support member by only assembling the partition member and the second support member with each other in the axial direction. Preferably, the elastic support member of the second support member is integrally formed with the flexible rubber layer. When the present mode (5) of the invention is employed together with the above-indicated mode (2), the elastic support member is also integrally with the sealing rubber of the second support member.

(6) A fluid-filled vibration-damping device according to any one of the above-indicated modes (1)–(5), wherein the engaging piece comprises a plurality of engaging pieces that are formed at respective circumferential portions of a peripheral portion of the partition member. According to this mode of the invention, although it is possible to form a cylindrical engaging piece, the engaging pieces are divided and spaced apart from each other in the circumferential direction of the partition member, allowing the engaging pieces to elastically deform with ease. This arrangement makes it easy to provisionally fix the partition member to the first or the second support member by utilizing the engaging mechanism of the raised and recessed portions or the like formed on the engaging pieces and the first or the second support member.

(7) A fluid-filled vibration-damping device according to any one of the above-indicated modes (1)–(6), wherein the fluid passage comprises a through hole formed through the partition member. This arrangement makes it possible to provide the fluid passage with simple structure.

BRIEF DESCRIPTION OF THE DRAWINGS

The forgoing and/or other objects features and advantages of the invention will become more apparent from the following description of a preferred embodiment with reference to the accompanying drawings in which like reference numerals are used to represent like elements and wherein.

DETAILED DESCRIPTION OF PREFERRED EMBODIMENTS

Figure 1:
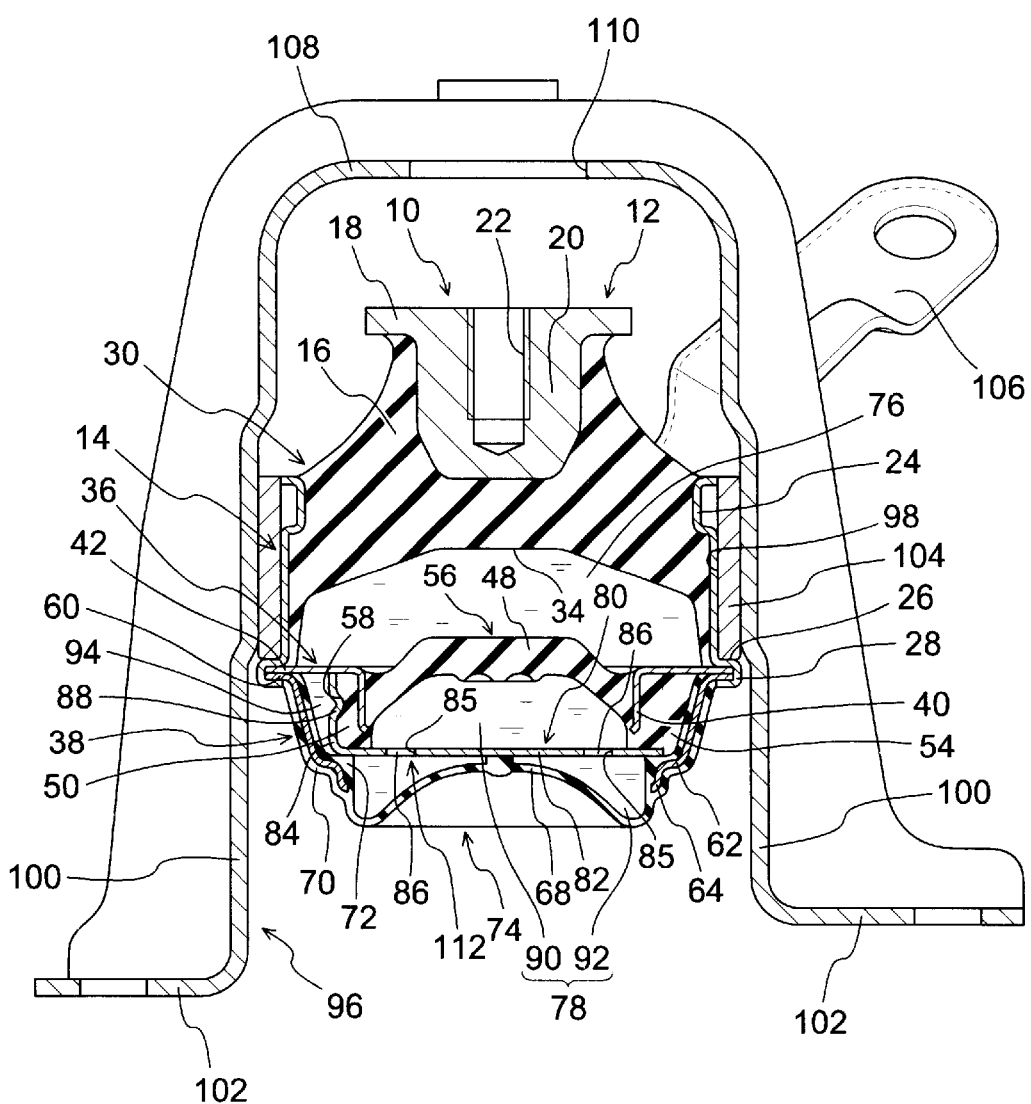
FIG. 1 is an elevational view in axial or vertical cross section of a fluid-filled vibration-damping device in the form of an engine mount for an automotive vehicle, which is constructed according to one embodiment of the present invention.

Referring first to FIG. 1, there is shown a first embodiment of a fluid-filled vibration-damping device of the present invention in the form of an engine mount 10 for use on an automotive vehicle. The engine mount 10 includes a first mounting member 12 and a second mounting member 14 which are both made of metallic materials and which are disposed in mutually opposed and spaced-apart relationship with each other. The first and second mounting members 12, 14 are elastically connected to each other by an elastic body 16 made of a rubber material. The present engine mount 10 is installed on the automotive vehicle such that the first mounting member 12 is attached to a power unit (not shown), while the second mounting member 14 is attached to a body of the vehicle (not shown), so that the power unit which includes an engine is mounted on the vehicle body in a vibration damping manner. When the engine mount 10 is installed on the vehicle as described above, a load or weight of the power unit acts between the first and second mounting members 12, 14 in a substantially axial direction of the mount 10, that is, in the vertical direction as seen in FIG. 1. The engine mount 10 receives a vibrational load primary in the vertical direction, which is hereinafter referred to as a primary load receiving direction, where appropriate.

The first mounting member 12 includes a disk shaped portion 18 formed in its axially upper end portion so as to extend in a direction perpendicular to the axial direction of the engine mount 10, and a solid cylindrical boss-like protruding portion 20 that is formed integrally with the disk shaped portion 18 so as to extend axially downward direction from the central portion of the disk shaped portion 18. The protruding portion 20 has a tapered cylindrical portion at its axially lower end portion. The tapered cylindrical portion of the protruding portion 20 has a diameter gradually decreasing toward the axially lower end of the protruding portion 20. The first mounting member 12 further includes a screw hole 22 that is formed in the central portion of the protruding portion 20 along the axis of the engine mount 10 and open in the upper end face of the disk shaped portion 18. The screw hole 22 is adapted to receive a screw (not shown) for attaching the first mounting member 12 to the power unit of the vehicle.

The second mounting member 14 is a generally cylindrical member with a relatively large diameter and includes a small diameter portion 24 integrally formed at its axially upper open-end portion and a caulking portion 28 integrally formed at its axially lower open-end portion whose diameter is made large due to the presence of an axially intermediate shoulder portion 26.

The first mounting member 12 is axially outwardly or upwardly spaced apart from the axially upper open-end portion of the second mounting member 14 in their axial direction, i.e., in the primary load receiving direction, and elastically connected to the second mounting member 14 by means of the elastic body 16 interposed therebetween.

The elastic body 16 has a generally frustoconical shape. The elastic body 16 is bonded at its small-diameter portion to the first mounting member 12 in the process of vulcanization of the rubber material of the elastic body 16, such that the outer peripheral portion of the disk shaped portion 18 is fitted on the end face of the small-diameter portion of the elastic body 16, while the protruding portion 20 is embedded within the small-diameter portion of the elastic body 16. A large-diameter end portion of the elastic body 16 has a generally constant diameter over a suitable axial length. The elastic body 16 is also bonded at an outer circumferential surface of its large-diameter portion to the second mounting member 14, which is disposed radially outwardly on the large diameter end portion of the elastic body 16, in the process of the above-indicated vulcanization. Thus, the first mounting member 12, the second mounting member 14 and the elastic body 16 are formed into a first intermediate integral vulcanized assembly 30. In this condition, the elastic body 16 fluid-tightly closes the axially upper open-end portion of the second mounting member 14. Meanwhile, the elastic body 16 has an inverted mortar shaped recess 34 having a large diameter and open in the large diameter end face of the elastic body 16, thereby decreasing a tensile stress generated in the elastic body 16 upon acting the weight of the power unit on the elastic body, resulting in an improved durability of the elastic body 16.

Figure 2:
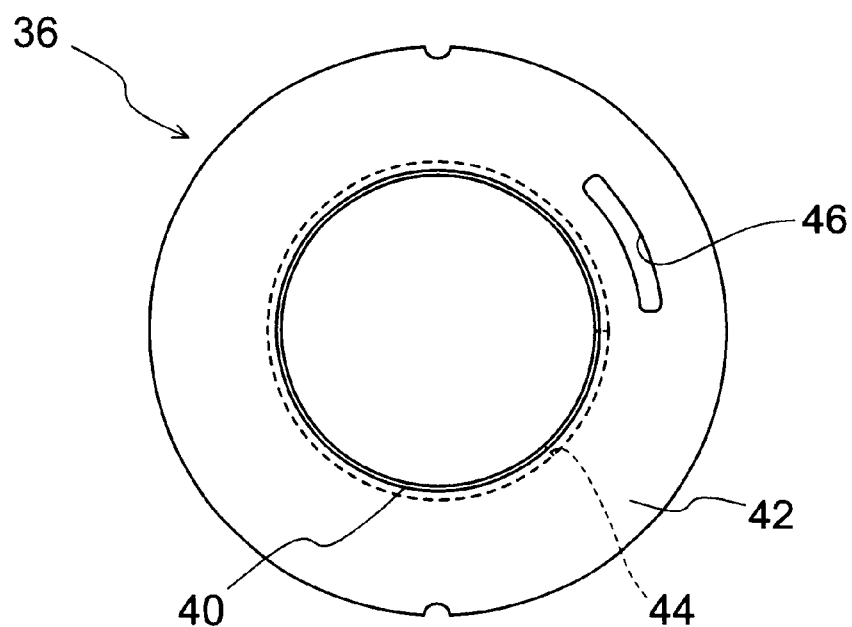
FIG. 2 is a top plane view of an orifice-plate member of the engine mount of FIG. 1.
Figure 3:
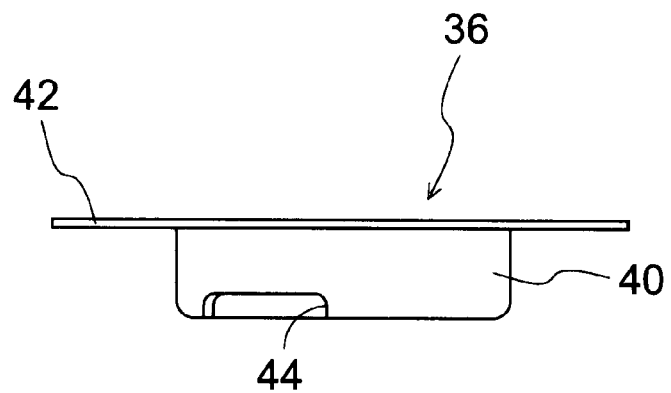
FIG. 3 is a right-side elevational view of the orifice member of FIG. 2.

A first support member in the form of an orifice-plate member 36 and a second support member in the form of a fixing cylindrical member 38 are assembled with the axially lower open-end portion of the second mounting member 14 so as to fluid-tightly close the lower open-end portion of the second mounting member 14. Referring to FIGS. 2 and 3, the orifice-plate member 36 is an annular member extending in its circumferential direction with a generally hook-shaped cross sectional shape. The orifice-plate member 36 includes a cylindrical inner sleeve portion in the form of a generally cylindrical wall portion 40 and an outward flange portion in the form of a first annular plate portion 42 that extends radially outwardly from an axially upper end portion of the cylindrical wall portion 40. The axially lower end portion of the cylindrical wall portion 40 is partially cut off by a given circumferential length, so as to form a communication hole 44 in the form of cutout at a circumferential position. The first annular plate portion 42 has a through hole serving as a communication hole 46 that is formed through a radially intermediate portion of the first annular plate portion 42 so as to extend in a circumferential direction by a given circumferential length. The communication hole 46 is formed at a circumferential position that is slightly offset from the communication hole 44 in the circumferential direction of the orifice-plate member 36 so as not to overlap with the communication hole 44 in any diametrical directions of the orifice-plate member 38.

Figure 4:
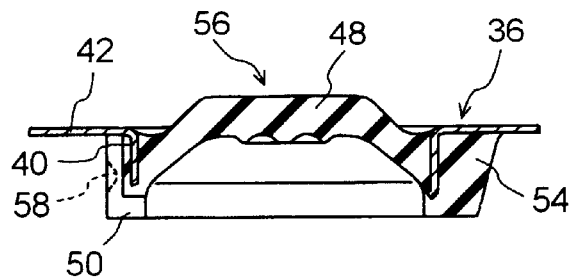
FIG. 4 is an elevational view in axial or vertical cross section of a second integrally vulcanized assembly of the engine mount of FIG. 1, taken along line 4—4 of FIG. 5.
Figure 5:
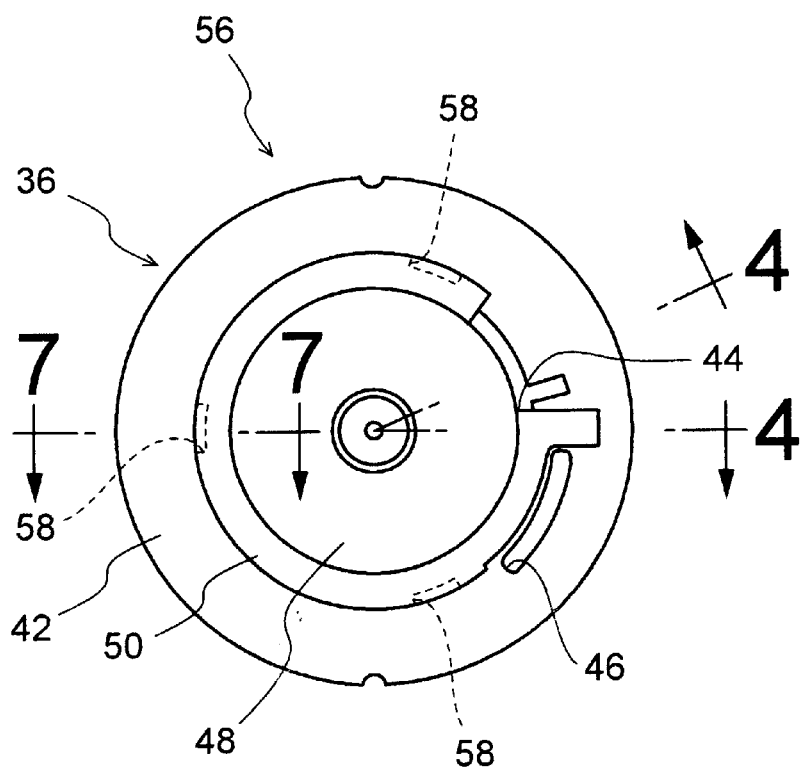
FIG. 5 is a bottom elevational view of the second integrally vulcanized intermediate assembly of FIG. 4.
Figure 6:
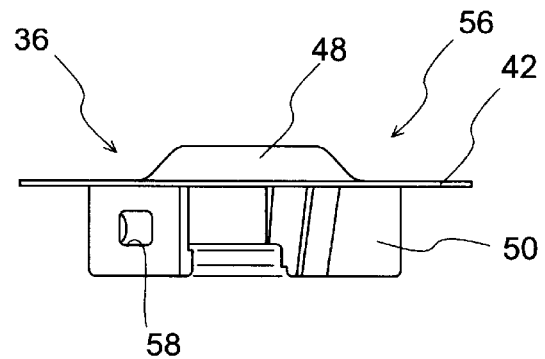
FIG. 6 is a front elevational view of the second integrally vulcanized assembly of FIG. 4.
Figure 7:
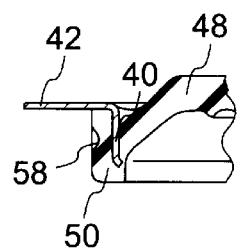
FIG. 7 is a fragmentally cross sectional view taken along line 7—7 of FIG. 5.

Referring to FIG. 4, a movable rubber plate 48 is disposed in the inner bore of the cylindrical wall portion 40 of the orifice-plate member 36 so as to close a central opening of the orifice-plate member 36, while an elastic support member in the form of an orifice-wall rubber member 50 is disposed on the outer circumferential surface of the cylindrical wall portion 40. The movable rubber plate 48 is a disk-like shaped member having a given wall thickness whose central portion is slightly protruded axially upwardly as seen in FIG. 1. The movable rubber plate 48 is bonded at its peripheral portion to the inner circumferential surface of the cylindrical wall portion 40 in the process of vulcanization of a rubber material for forming the movable rubber plate 48, thereby fluid tightly closing the central opening of the orifice-plate member 36. On the other hand, the orifice-wall rubber member 50 is a generally cylindrical rubber member and bonded at its inner circumferential surface onto the outer circumferential surface of the cylindrical wall portion 40 in the process of vulcanization of a rubber material for forming the orifice-wall rubber member 50. The orifice-wall rubber member 50 includes a block wall portion 54 integrally formed at a circumferential position interposed between the communication holes 44, 46, so as to protrude radially outwardly. The orifice-wall rubber member 50 serves to provide a circumferential groove whose opposite ends are defined by circumferentially opposite end faces of the block wall portion 54. The circumferential groove is disposed radially outwardly of the hollow cylindrical wall portion 40 and extends in a circumferential direction thereof by a circumferential length that is slightly smaller than a circumference thereof due to the presence of the block wall portion 54. One of the opposite ends of the circumferential groove is open in the upper surface of the first annular plate portion 42 through the communication hole 46, while the other end of the circumferential groove is open in the inner circumferential surface of the cylindrical wall portion 40 through the communication hole 44. As is apparent from FIGS. 4–7, the orifice-plate member 36, the movable rubber plate 48 and the orifice-wall rubber member 50 are formed into a second integral vulcanized assembly 56.

The orifice-wall member 50 as one component of the second integral vulcanized assembly 56, is formed with a engaging portion in the form of engaging grooves 58, 58, 58 open in the outer circumferential surface thereof. These engaging grooves 58, 58, 58 are formed at respective circumferential positions which are equally spaced apart from one another in a circumferential direction of the orifice-wall member 50, and which are also spaced apart from the communication holes 44, 46 in the circumferential direction. Each of the engaging grooves 58 may have a variety of configurations. In the present embodiment, the each engaging groove 58 is formed as a circumferential groove extending in the circumferential direction with a generally constant arcuate cross-sectional shape by way of example.

On the other hand, the fixing cylindrical member 38 is set to the axially lower end face of the second mounting member 14. The fixing cylindrical member 38 is a large-diameter tapered cylindrical member whose diameter gradually decreases in the axially downward direction thereof as seen in FIG. 1. A flange portion 60 is integrally formed at a large diameter end portion of the fixing cylindrical member 38 so as to extend radially outwardly. An inward flange portion in the form of a second annular plate portion 62 is integrally formed at a small diameter end portion of the fixing cylindrical member 38 so as to extend radially inwardly. The protruding end portion of the second annular plate portion 62 is bent axially downwardly as seen in FIG. 1, so as to provide an integrally formed cylindrical support portion 64.

A flexible rubber layer in the form of a flexible diaphragm 68 is disposed in the axially lower open-end portion of the fixing cylindrical member 38 such that the flexible diaphragm 68 is bonded at its peripheral portion to the axially lower open-end portion of the flexible diaphragm 68 in the process of vulcanization of the rubber material for forming the flexible diaphragm 68. Thus, the flexible diaphragm 68 fluid-tightly closes the axially lower open-end portion of the fixing cylindrical member 38. The fixing cylindrical member 38 is coated at a substantially entire area of its inner and outer circumferential surfaces with a sealing rubber layer 70 having a small thickness. The sealing rubber layer 70 is bonded to the inner and outer circumferential surfaces of the fixing cylindrical member 38 in the process of vulcanization of a rubber material for forming the sealing rubber layer 70. In the present embodiment, the above-indicated processes of vulcanization for forming the sealing rubber layer 70 and the flexible diaphragm 68 are simultaneously performed so that the sealing rubber layer 70 and the flexible diaphragm 68 are integrally formed. In addition, a sealing rubber in the form of an orifice-bottom-wall rubber member 72 is formed on the inner circumferential surface of the cylindrical support portion 64 so as to protrude radially inwardly. Namely, the cylindrical support portion 64 supports the orifice-bottom-wall rubber member 72 integrally formed with the flexible diaphragm 68. It is noted that the fixing cylindrical member 38, the flexible diaphragm 68, the sealing rubber layer 70 and the orifice-bottom-wall rubber member 72 are formed into a third intermediate integral vulcanized assembly 74.

The thus formed third integral vulcanized assembly 74 is set to the axially lower end face of the second integral vulcanized assembly 56 such that the first annular plate portion 42 of the orifice-plate member 36 of the second integral vulcanized assembly 56 and the flange portion 60 of the fixing cylindrical member 38 of the third integral vulcanized assembly 74 are mutually superposed on each other at their outer peripheral portions. The mutually superposed first annular plate portion 42 and the flange portion 60 are set at their peripheral portions to the shoulder portion 26 of the second mounting member 14 in this order, and then the caulking portion 28 of the second mounting member 14 is caulked against the first annular plate portion 42 and the flange portion 60. Thus, the second and third intermediate integral vulcanized assemblies 56, 74 are fluid tightly fixed to the axially lower open-end portion of the second mounting member 14, i.e., the first integral vulcanized assembly 30, thereby fluid tightly closing the axially lower open-end of the second mounting member 14.

With the first, second and third integral vulcanized assemblies fixed together, the axially upper open-end of the second mounting member 14 is fluid-tightly closed the elastic body 16, while the axially lower open-end of the second mounting member 14 is fluid-tightly closed by the movable rubber plate 48 and the flexible diaphragm 68. In this condition, the elastic body 16 and the movable rubber plate 48 are opposed to each other with a given axial spacing therebetween and cooperate to form therebetween a primary fluid chamber 76 partially defined by the elastic body 16 and the movable rubber plate 48. On the other hand, the movable rubber plate 48 and the flexible diaphragm 68 are opposed to each other with a given axial spacing therebetween and cooperate to form therebetween an auxiliary fluid chamber 78 partially defined by the flexible diaphragm 68. The primary and auxiliary fluid chambers 76, 78 are both filled with a non-compressible fluid. The non-compressible fluid filling the primary and auxiliary fluid chambers 76, 78 is preferably selected from among water, alkylene glycol, polyalkylene glycol and silicone oil, or a mixture thereof, for example. In particular, to assure an excellent vibration damping effect of the engine mount 10 on the basis of a flow or a resonance of the non-compressible fluid, the non-compressible fluid desirably has a viscosity not higher than 0.1 Pa·s. The filling of the non-compressible fluid to the primary and auxiliary fluid chambers 76, 78 is advantageously effected by assembling by caulking the first integral vulcanized assembly 30 against to second and third integral vulcanized assemblies 56, 74 in a mass of the selected non-compressible fluid.

Figure 8:
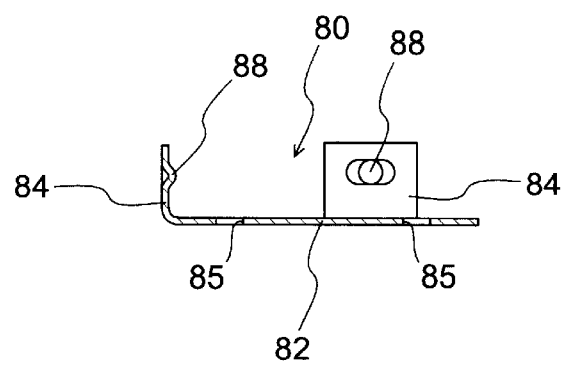
FIG. 8 is an elevational view in axial or vertical cross section of a partition-plate member of the engine mount of FIG. 1.
Figure 9:
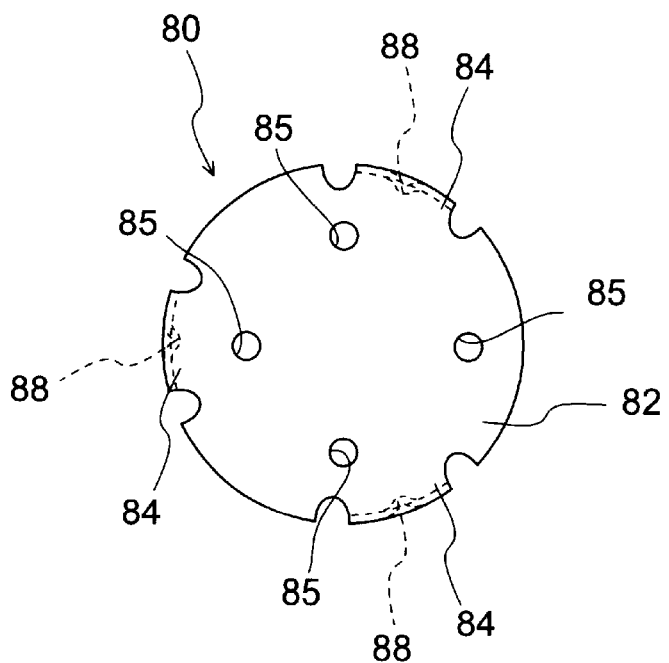
FIG. 9 is a bottom elevational view of the partition member of FIG. 8.

Within the auxiliary fluid chamber 78, a partition member in the form of a partition plate 80 is disposed. As shown in FIGS. 8 and 9, the partition plate 80 is made of metal, synthetic resin material or other rigid materials, and includes a disk-like plate portion 82 extending in a direction perpendicular to an axial direction thereof and three engaging pieces in the form of three engaging plates 84, 84, 84 formed at respective circumferential positions of the peripheral portion of the disk-like plate portion 82 so as to extend straightly in an axially upward direction thereof as seen in FIGS. 1 and 8. The partition plate 80 is also provided with four through holes 85, 85, 85, 85 formed through respective circumferential portions of the intermediate portion of the disk-like plate portion 82, which are equally spaced apart from one another in the circumferential direction of the disk-like plate portion 82.

Each of the engaging plates 84 has an engaging portion in the form of an engaging projection 88 integrally formed at its inner circumferential surface so as to protrudes radially inwardly with a generally arcuate cross-sectional shape. The engaging projection 88 is configured to substantially match to the corresponding engaging groove 58 in terms of size and shape. The partition plate 80 thus configured is inserted onto the second integral vulcanized assembly 56 from the axially lower end portion of the second integral vulcanized assembly 56 such that the engaging plates 84, 84, 84 are disposed radially outwardly on the orifice-wall rubber member 50 with the engaging projections 88 are fitted into the engaging grooves 58, respectively. Thus, it is prevented that the engaging projections 88 are disengaged from the engaging grooves 58, respectively. As is understood from the aforementioned description, the engaging plates 84 are adapted to position the partition plate 80 relative to the first integral vulcanized assembly 30 in a radial direction perpendicular to its axial direction, while avoiding a disengagement of the partition plate 80 from the first integral vulcanized assembly 30.

The partition plate 80 thus assembled with the second integral vulcanized assembly 56 is disposed in the auxiliary fluid chamber 78 so as to be located at an axially intermediate portion of the auxiliary fluid chamber 78, while extending in a direction perpendicular to the axial direction. The partition plate 80 is firmly fixed to the second integral vulcanized assembly 56 with the engaging projections 88 of the engaging plate 84 fitted into the engaging grooves 58 of the orifice-wall rubber member 50. Further, the disk-like plate portion 82 of the partition member 80 is disposed between the orifice-plate member 36 and the fixing cylindrical member 38 such that the peripheral portion of the disk-like plate portion 82 is forcedly held by and between the orifice-plate member 36 and the fixing cylindrical member 38 via the orifice-wall rubber member 50 and the orifice-bottom-wall rubber member 72. Thus, the auxiliary fluid chamber 78 is fluid-tightly divided by the partition plate 80 into two chambers, namely, an intermediate chamber 90 partially defined by the movable rubber plate 48 on the axially upper side of the partition plate 80, and an equilibrium chamber 92 partially defined by the flexible diaphragm 68 on the lower side of the partition plate 80. As is understood from the foregoing description, the orifice-wall rubber member 50 functioning as an elastic support member, which is disposed on the outer circumferential surface of the cylindrical wall portion 40 of the orifice-plate member 36, further functions as a sealing rubber for assuring a fluid-tight sealing at around the peripheral portion of the partition plate 80 held by and between the orifice-plate member 36 and the fixing cylindrical member 38.

The orifice-plate member 36 and the fixing cylindrical member 38 cooperate to define therebetween a circumferential orifice passage 94 disposed radially outwardly of the intermediate chamber 90 and extending along the inner circumferential surface of the fixing cylindrical member 38. With the block wall portion 54 of the orifice-wall rubber member 50 is compressed onto the inner circumferential surface of the fixing cylindrical member 38, the orifice passage 94 is fluid-tightly blocked at one circumferential position thereof. Therefore, the orifice passage 94 extends in its circumferential direction over a circumferential length slightly smaller than the entire circumference thereof. One of circumferentially opposite ends of the orifice passage 94 is held in fluid communication with the primary fluid chamber 76 through the communication hole 46 formed through the first annular plate portion 42, while the other end of the orifice passage 94 is held in fluid communication with the intermediate chamber 90 through the communication hole 44 formed in the cylindrical wall portion 40 of the orifice-plate member 36. That is, the orifice passage 94 for permitting a fluid communication and flows of the fluid therethrough between the primary fluid chamber 76 and the intermediate chamber 90 is formed between and defined by the cylindrical wall portions of the orifice-plate member 36 and the fixing cylindrical member 38, and the first and second annular plate portions 42, 62. The intermediate chamber 90 and the equilibrium chamber 92 are held in fluid communication through four fluid passages 86, 86, 86, 86 defined by the through holes 85, 85, 85, 85 formed through the disk-like plate portion 82 of the partition plate 80, thereby allowing fluid to flow through the fluid passages 86, 86, 86, 86 between the intermediate and equilibrium chamber 90, 92. In the present embodiment, the orifice passage 94 is tuned so that the engine mount 10 can exhibit a vibration damping effect with respect to lower frequency vibrations such as idling vibration on the basis of the resonance or flows of the fluid therethrough, and the fluid passages 86 are tuned so that the engine mount 10 can exhibit a vibration damping effect with respect to higher frequency vibrations such as booming noises on the basis of the flows of the fluid therethrough, by way of example.

As shown in FIG. 1, the engine mount 10 constructed as described above is assembled with a bracket 96 that is adapted to fix the second mounting member 14 of the engine mount 10 to a member on the side of the body of the vehicle (hereinafter referred to as "body-side member"), by press fitting the second mounting member 14 into a cylindrical fixing bore 98 of the bracket 96. The bracket 96 is fashioned from a metallic plate into a generally gate-shaped member by pressing. The bracket 96 includes a pair of column portions 100, 100 whose protruding end portions are bent outwardly so as to provide fixing plate portions 102, 102. The fixing plate portions 102, 102 is placed on and bolted to the body side member, whereby the second mounting member 14 of the engine mount 10 is firmly fixed to the body-side member via the bracket 96. A hollow cylindrical fixing support member 104 made of metal is disposed so as to extend between and be welded to the both column portions 100, 100, for providing the cylindrical fixing bore 98. A fixing stay 106 is fixed to the outer circumferential surface of the fixing support member 104 so as to protrude radially outwardly. The bracket 96 has a top wall portion 108 having a through hole 110 formed through a generally central portion thereof. The through hole 110 permits a member on the side of the power unit (not shown) to be inserted therethrough to be bolted to the first mounting member 12 by means of a bolt threaded into the screw hole 22.

The engine mount 10 constructed according to the present embodiment as described above, may be assembled as follows, for example.

First, the first integral vulcanized assembly 30 comprising of the first and second mounting members 12, 14 and the elastic body 16 is prepared. The second integral vulcanized assembly 56 comprising the orifice-plate member 36 and the movable rubber plate 48, and the third integral vulcanized assembly 74 comprising the fixing cylindrical member 38 and the flexible diaphragm 68 are prepared respectively. The partition plate 80 is also prepared independently.

Initially, the proposed partition plate 80 is fitted onto the second integral vulcanized assembly 56 in the axial direction so that the engaging projections 88 of the engaging plate 84 are fitted into the engaging grooves 58 open in the outer circumferential surface of the orifice rubber member 50, respectively. Thus, the partition plate 80 is provisionally fixed to the second integral vulcanized assembly 56. The second integral vulcanized assembly 56 provisionally assembled with the partition plate 80 is hereinafter referred to as a "provisional assembly 112". The provisional assembly 112 is then set to the axially lower end portion of the second mounting member 14 of the first integral vulcanized assembly 30. Subsequently, the third integral vulcanized assembly 74 is set to the axially lower end portion of the second integral vulcanized assembly 56 with the first annular plate portion 42 of the orifice-plate member 36 and the flange portion 60 of the fixing cylindrical member 38 being superposed on with each other. The caulking portion 28 of the second mounting member 14 is caulked against the first annular plate 42 and the flange portion 60, whereby the second and third integral vulcanized assemblies 56, 74 as well as the partition plate 80 are firmly and fluid-tightly fixed to the second member 14 of the first integral vulcanized assembly 30. Thus, the engine mount 10 constructed according to the present embodiment is produced. Preferably, the first, second and third integral vulcanized assemblies 30, 56, 74 as well as the partition plate 80 are assembled together within a mass of the non-compressible fluid, for thereby filling the primary, intermediate and equilibrium chambers 76, 90, 92 with the non-compressible fluid at the same time when these components 30, 56, 74, 80 are assembled together.

The engine mount 10 constructed as described above is operable as follows for example. When the vehicle is in an engine idling condition, low frequency and large amplitude vibrations such as idling vibrations are applied between the first and second mounting members 12, 14, so that a pressure of the fluid in the primary fluid chamber 76 varies due to the elastic deformation of the elastic body 16. The fluid is forced to flow between the primary fluid chamber 76 and the auxiliary fluid chamber 78 through the orifice passage 94 due to a pressure difference between the two chambers 76, 78. Thus, the engine mount 10 is capable of exhibiting an excellent vibration damping effect with respect to the idling vibrations, on the basis of resonance or flows of the fluid through the orifice passage 94. When the vehicle is in a running condition, on the other hand, high frequency and small amplitude vibrations such as booming noises are applied between the first and second mounting members 12, 14. Since the frequency of the input vibration, i.e., the booming noises is higher than the frequency band to which the orifice passage 94 is tuned, a resistance to flow of the fluid through the orifice passage 94 tends to be increased, making it difficult for the fluid to flow through the orifice passage 94. In this case, the movable rubber plate 48 is elastically displaced or oscillated so as to reduce or absorb a fluid pressure variation in the primary fluid chamber 76, thus transmitting the fluid pressure variation in the primary fluid chamber 76 to the intermediate chamber 90. As a result, the fluid is forced to flow between the intermediate chamber 90 and the equilibrium chamber 92 through the fluid passages 86 due to a pressure difference between the two chambers 90, 92. Thus, the engine mount 10 can exhibit an excellent vibration damping effect with respect to the booming noises, on the basis of resonance or flows of the fluid through the fluid passages 86.

Figure 10:
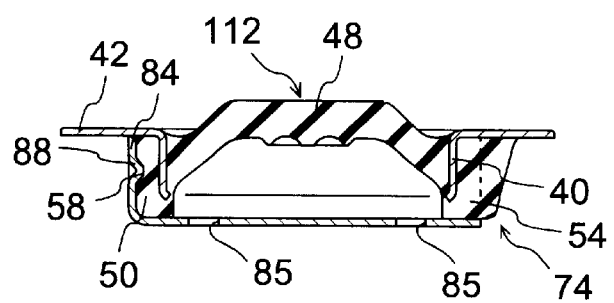
FIG. 10 is an elevational view in vertical or axial cross section of a provisionally fixed assembly of the engine mount of FIG. 1.

One of advantageous features of the present embodiment is that the partition plate 80 can be provisionally fixed to the second integral vulcanized assembly 54 to be provided as the provision assembly 112 as shown in FIG. 10., before the first, second and third integral vulcanized assemblies 30, 56, 74 are assembled together. Accordingly, the partition plate 80 can be automatically disposed in position by only assembling the first, second and third integral vulcanized assemblies 30, 56 (118), 74 are assembled together in the same manner performed in the conventional fluid-filled vibration-damping device that includes no partition member dividing the auxiliary fluid chamber.

Another advantageous feature of the present embodiment is that the partition member 80 is forcedly held at its peripheral portion by and between the orifice-plate member 36 and the fixing cylindrical member 38, when the first, second and third integral vulcanized assemblies 30, 56, 74 are fixedly assembled together by caulking. This arrangement enables the engaging mount 10 to eliminate a need for adopting a specific arrangement, e.g., caulking or adhesive treatment, for fixing the partition member 80 to the orifice-plate member 36 or the fixing cylindrical member 38, thus making it possible to fixedly dispose the partition member 80 in the auxiliary fluid chamber 78 with a simple structure and with ease.

Figure 11:
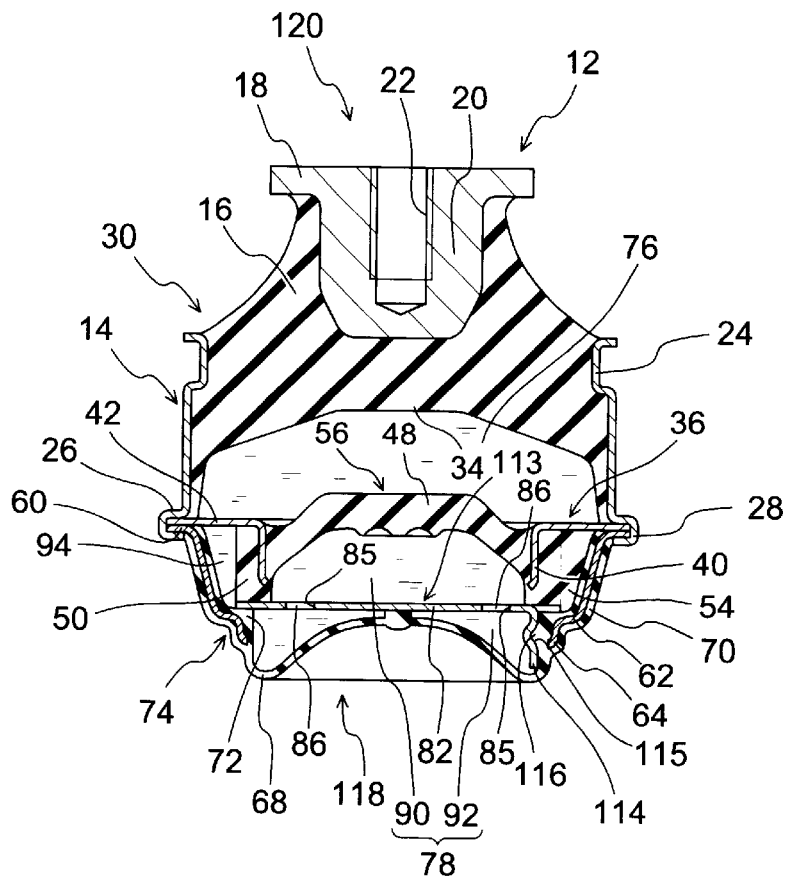
FIG. 11 is an elevational view in axial or vertical cross section of a fluid-filled vibration-damping device in the form of an engine mount for an automotive vehicle, which is constructed according to another embodiment of the present invention.

Referring next to FIG. 11, there is shown a second embodiment of a fluid-filled vibration-damping device of the present invention in the form of an engine mount 120 for use an automotive vehicle. The same reference numerals as used in the first embodiment will be used in this embodiment, to identify the functionally corresponding or structurally similar elements, which will not be described in detail to avoid redundancy of description.

The engine mount 120 of the present invention adopts a partition plate 113 that is different in construction from the partition plate 80 adopted in the engine mount 10 of the first embodiment. The partition plate 113 of the present engine mount 120 includes a disk-like plate member 80 like in the partition plate 80, and three engaging plates 114, 114, 114 formed at respective circumferential portions in the peripheral portion of the disk-like plate portion 82 so as to extend straightly in an axially downward direction as shown in FIG. 11. Each of the partition plates 114 is provided with an engaging recess 115 open in its outer circumferential surface.

In the present embodiment, the orifice-bottom-wall rubber member 72, as one component of the third integral vulcanized assembly 74, includes the engaging portion in the form of engaging projections 116, 116, 116 integrally formed at its inner circumferential surface so as to protrude radially inwardly.

Figure 12:
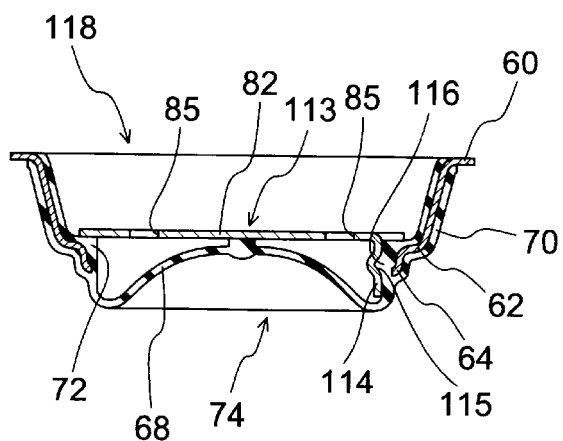
FIG. 12 is an elevational view in vertical or axial cross section of a provisionally fixed assembly of the engine mount of FIG. 11.

The engine mount 120 constructed according to the present embodiment may be assembled as follows, for example. Like in the first embodiment, the first, second and third integral vulcanized assemblies 30, 56, 74 and the partition plate 113 are prepared independently of one another. In the present embodiment, the partition plate 113 is provisionally fixed to the third integral vulcanized assembly 74 rather than the second integral vulcanized assembly 56. Namely, the partition plate 113 is fitted into the third integral vulcanized assembly 74 in their axial directions so that the engaging plates 114 are fitted into the bore of the orifice-bottom-wall rubber member 72 with the engaging projections 116 formed in the orifice-bottom-wall rubber member 72 being fitted into the engaging recesses 115 formed in the engaging plates 114. Thus, the partition plate 113 is provisionally fixed to the third integral vulcanized assembly 74, as shown in FIG. 12. The third integral vulcanized assembly 74 provisionally assembled with the partition plate 113 is hereinafter referred to as a "provisional assembly 118". Like the first embodiment, the provisional assembly 118 is assembled with the first and second integral vulcanized assemblies within the mass of the non-compressible fluid. Namely, the second integral vulcanized assembly 56 is set to the axially lower end portion of the second mounting member 14 of the first integral vulcanized assembly 30. Subsequently, the provisional assembly 118 is set to the axially lower end portion of the second integral vulcanized assembly 56 with the first annular plate portion 42 of the orifice-plate member 36 and the flange portion 60 of the fixing cylindrical member 38 being superposed on each other. The caulking portion 28 of the second mounting member 14 is caulked against the first annular plate 42 and the flange portion 60, whereby the second and third integral vulcanized assembly 56, 74 as well as the partition plate 113 are firmly and fluid-tightly fixed to the second member 14 of the first integral vulcanized assembly 30. Thus, the engine mount 120 constructed according to the present embodiment is produced.

As is understood from the foregoing description, the orifice-bottom-wall rubber member 72 serves as the elastic support member as well as the sealing rubber in the present embodiment.

Therefore, the engine mount 120 constructed according to the present invention can enjoy the same advantages with the engine mount 10 constructed according to the first embodiment. In addition, the engaging plates 114 of the partition plate 113 is disposed within the equilibrium chamber 92 in the present embodiment, effectively preventing the engaging plates 114 from undesirably decreasing the volume or the cross sectional area of the orifice passage 94.

While the present invention has been described in detail with its presently preferred embodiments for the illustrative purpose only, it is to be understood that the invention is not limited to the details of the illustrated embodiments, but may be otherwise embodied.

For instance, the orifice passage 94 and the fluid passage 86 provided in the present vibration-damping device may be formed with a desirable length, a desirable cross sectional area and a desirable configuration, without any specific limitation, while taking into account required vibration damping characteristics of the vibration-damping device. For instance, the partition member 80 may be modified to have a relatively large wall thickness, in order to provide a fluid passage formed therethrough in its wall-thickness direction.

While the partition member 80 provided in the illustrated embodiment includes a plurality of engaging plates 84 formed at the peripheral portion thereof while being mutually spaced apart from one another in its circumferential direction, it may be possible to adopt an engaging plate that continuously extends in the circumferential direction over a circumferential length not smaller than a half of a circumference of the partition member, for example. Further, the engaging portion (projection 88) may have a variety of configurations. For instance, the engaging projections and the engaging grooves may be configured so as to continuously extend in the circumferential direction.

A variety of structures may be adoptable in the fluid-filled vibration-damping device of the present invention for fixing the partition plate 84 to the orifice-plate member 36 and/or the fixing cylindrical member 38 without any specific limitation. For instance, the partition member 80 provided in the first embodiment may be modified such that the partition plates 84 is bent radially inwardly at its protruding end portions or alternatively is entirely inclined radially inwardly, so as to be fixed to the outer circumferential surface of the orifice-wall rubber member 50, or so as to be fixed to the inner circumferential surface of the cylindrical wall portion 40 of the orifice-plate member 36.

In the illustrated embodiment, the primary fluid chamber 76 serving as a pressure receiving chamber is held in fluid communication with the intermediate chamber 90 through the orifice passage 94, and is also held in fluid communication with the equilibrium chamber 92 via the intermediate chamber 90 through the fluid passage 86. In the present invention, the primary fluid chamber 76 and auxiliary fluid chamber 92 may be directly connected with each other via the orifice passage 94.

While the present invention is applied to a mount type engine mount for an automotive vehicle wherein a load or weight of the power unit is applied in a direction in which the first and second mounting members 12, 14 are moved toward each other, by way of example in the illustrated embodiment, the present invention is similarly applicable to a hanging type engine mount as disclosed in JP-A-8-128491 wherein the load or weight of the power unit is applied in the direction in which the first and second mounting members 12, 14 are moved away from each other.

While the present invention is applied to the engine mount for the automotive vehicle, in the illustrated embodiments, the present invention is suitably applicable to other fluid-filled vibration-damping devices used for the vehicle, such as a body mount, and a member mount, and used for various kinds of devices other than the vehicles.

It is also to be understood that the present invention may be embodied with various other changes, modifications sand improvements, which may occur to those skilled in the art, without departing from the spirit and scope of the invention defined in the following claims.

What is claimed is:

1. A fluid-filled vibration-damping device comprising:

a first mounting member;

a second mounting member having a generally cylindrical configuration and being spaced apart from said first mounting member with one of axially opposite open-end portions thereof opposed to said first mounting member;

an elastic body elastically connecting said first and second mounting member while fluid-tightly closing said one of opposite open-end portions of said second mounting member;

an annular first support member;

a movable rubber plate bonded at a peripheral portion thereof to said annular first support member;

an annular second support member;

a flexible rubber layer bonded at a peripheral portion thereof to said annular second support member, said movable rubber plate and flexible rubber layer being axially assembled with each other and fixed to an other one of axially opposite open-end portions of said second mounting member by means of caulking of said other one of axially opposite end portions of the second mounting member against said first and second support members so as to fluid tightly close said other one of axially opposite open-end portions of the second mounting member such that said elastic body and said movable rubber plate cooperate to form therebetween a primary fluid chamber to which a vibrational load is applied and said movable rubber plate and said flexible rubber layer cooperate to form therebetween an auxiliary fluid chamber, said primary and auxiliary fluid chamber being filled with non-compressible fluid and held in fluid communication with each other through an orifice passage that is formed between said first and second support members so as to extend circumferentially;

a partition member disposed in said auxiliary fluid chamber with an peripheral portion thereof forcedly held by and between said first and second support members, so as to divide said auxiliary fluid chamber into an intermediate chamber partially defined by said movable rubber plate and an equilibrium chamber partially defined by said flexible rubber layer; and a fluid passage for fluid communication between said intermediate chamber and said equilibrium chamber, wherein said partition member includes an engaging piece extending toward and being engaged with one of said first and second support members so as to enable said partition member to be provisionally fixed to said one of said first and second support members for assembly of said partition member, and wherein said first and second support members include respective sealing rubbers formed at respective portions by which said peripheral portion of said partition member is forcedly held so that said peripheral portion of said partition member is fluid-tightly forcedly held by and between said first and second support members via said sealing rubbers.

2. A fluid-filled vibration-damping device according to claim 1, wherein said first support member has a generally hook-shape in cross section and includes a cylindrical inner sleeve portion and an outward flange portion extending radially outwardly from one of axially opposite end portions of said inner sleeve portion, while said second support member has a generally hook-shape in cross section and includes a cylindrical outer sleeve portion and an inwardly flange portion extending radially inwardly from one of axially opposite end portions of said outer cylindrical portion, said first and second support members being axially assembled with each other such that said inner and outer sleeve portions are opposed to each other with an radial spacing therebetween while the outward and inward flange portions are opposed to each other with an axial spacing therebetween, to thereby form therebetween said orifice passage.

3. A fluid-filled vibration-damping device according to claim 2, further comprising an elastic support member formed on an outer circumferential surface of said inner sleeve portion of said first support member and having an engaging portion formed on an outer circumferential surface thereof, wherein said engaging portion is engageable with said engaging piece of said partition member.

4. A fluid-filled vibration-damping device according to claim 2, wherein said second supporting member further includes a cylindrical support portion integrally formed at an inner peripheral portion of said inward flange portion thereof, so as to extend axially outwardly, and an elastic support member formed on an inner circumferential surface of said cylindrical support portion and provided with an engaging portion formed at an inner circumferential surface thereof, wherein said engaging portion is engageable with said engaging piece of said partition member.

5. A fluid-filled vibration-damping device according to claim 1, wherein said fluid passage comprises a through hole formed through said partition member.

6. A fluid-filled vibration-damping device according to claim 1, wherein said engaging piece is adapted to position said partition member relative to said one of said first and second support members in a radial direction perpendicular to an axial direction of said partition member, while being adapted to avoid an disengagement of said partition member from said one of said first and second support members in said axial direction.

7. A fluid-filled vibration-damping device according to claim 1, wherein said orifice passage is tuned to a first frequency band that is lower than a second frequency band to which said fluid passage is tuned.

8. A fluid-filled vibration-damping device comprising:

a first mounting member;

a second mounting member having a generally cylindrical configuration and being spaced apart from said first mounting member with one of axially opposite open-end portions thereof opposed to said first mounting member;

an elastic body elastically connecting said first and second mounting member while fluid-tightly closing said one of opposite open-end portions of said second mounting member;

an annular first support member;

a movable rubber plate bonded at a peripheral portion thereof to said annular first support member;

an annular second support member;

a flexible rubber layer bonded at a peripheral portion thereof to said annular second support member;

a flexible rubber layer bonded at a peripheral portion thereof to an annular second support member;

said movable rubber plate and flexible rubber layer being axially assembled with each other and fixed to an other one of axially opposite open-end portions of said second mounting member by means of caulking of said other one of axially opposite end portions of the second mounting member against said first and second support members so as to fluid tightly close said other one of axially opposite open-end portions of the second mounting member such that said elastic body and said movable rubber plate cooperate to form therebetween a primary fluid chamber to which a vibrational load is applied and said movable rubber plate and said flexible rubber layer cooperate to form therebetween an auxiliary fluid chamber, said primary and auxiliary fluid chamber being filled with non-compressible fluid and held in fluid communication with each other through an orifice passage that is formed between said first and second support members so as to extend circumferentially;

a partition member disposed in said auxiliary fluid chamber with an peripheral portion thereof forcedly held by and between said first and second support members, so as to divide said auxiliary fluid chamber into an intermediate chamber partially defined by said movable rubber plate and an equilibrium chamber partially defined by said flexible rubber layer; and a fluid passage for fluid communication between said intermediate chamber and said equilibrium chamber, wherein said partition member includes an engaging piece extending toward and being engaged with one of said first and second support members so as to enable said partition member to be provisionally fixed to said one of said first and second support members for assembly of said partition member, and wherein said engaging piece comprises a plurality of engaging pieces that are formed at respective circumferential portion in a peripheral portion of said partition member.

9. A method of producing a fluid-filled vibration-damping device including: a first mounting member; a second mounting member having a generally cylindrical configuration and being spaced apart from said first mounting member with one of axially opposite open-end portions thereof opposed to said first mounting member; an elastic body elastically connecting said first and second mounting member while fluid-tightly closing said one of opposite open-end portions of said second mounting member; an annular first support member; a movable rubber plate bonded at a peripheral portion thereof to said annular first support member; an annular second support member: a flexible rubber layer bonded at a peripheral portion thereof to said annular second support member, said movable rubber plate and flexible rubber layer being axially assembled with each other and fixed to an other one of axially opposite open-end portions of said second mounting member by means of caulking of said other one of axially opposite end portions of the second mounting member against said first and second support members so as to fluid tightly close said other one of axially opposite open-end portions of the second mounting member such that said elastic body and said movable rubber plate cooperate to form therebetween a primary fluid chamber to which a vibrational load is applied and said movable rubber plate and said flexible rubber layer cooperate to form therebetween an auxiliary fluid chamber, said primary and auxiliary fluid chamber being filled with non-compressible fluid and held in fluid communication with each other through an orifice passage that is formed between said first and second support members so as to extend circumferentially; a partition member disposed in said auxiliary fluid chamber with an peripheral portion thereof forcedly held by and between said first and second support members, so as to divide said auxiliary fluid chamber into an intermediate chamber partially defined by said movable rubber plate and an equilibrium chamber partially defined by said flexible rubber layer; and a fluid passage for fluid communication between said intermediate chamber and said equilibrium chamber, wherein said partition member includes an engaging piece extending toward and being engaged with one of said first and second support members so as to enable said partition member to be provisionally fixed to said one of said first and second support members for assembly of said partition member, and wherein said first and second support members include respective sealing rubbers formed at respective portions by which said peripheral portion of said partition member is forcedly held so that said peripheral portion of said partition member is fluid-tightly forcedly held by and between said first and second support members via said sealing rubbers, said method comprising the steps of:

provisionally fixing said partition member to said one of said first and second support members by engaging said engaging piece of said partition member with said one of said first and second support members;

superposing said one of said first and second support members to which said partition member is provisionally fixed, and an other one of said first and second support members on each other in an axial direction thereof; and then fluid-tightly fixing said first and second support members superposed on each other to said other one of axially opposite open-end portions of said second mounting member by means of said caulking.

10. A method of producing a fluid-filled vibration damping device according to claim 9, wherein said partition member is provisionally fixed to said one of said first and second mounting member in the atmosphere, and said first and second mounting members are superposed on each other and then fixed to said other one of axially opposite open-end portions of said second mounting member within a mass of said non-compressible fluid.

* * * * *